United States Patent
Mankovskii et al.

(10) Patent No.: US 10,290,325 B1
(45) Date of Patent: May 14, 2019

(54) SECURING PROTECTED CONTENT BY IDENTIFYING RECORDING DEVICES

(71) Applicant: CA, Inc., New York, NY (US)

(72) Inventors: Serguei Mankovskii, Morgan Hill, CA (US); George Watt, Kanata (CA)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/938,476

(22) Filed: Mar. 28, 2018

(51) Int. Cl.
 *H04N 9/80* (2006.01)
 *G11B 27/36* (2006.01)
 *G06N 20/00* (2019.01)

(52) U.S. Cl.
 CPC ............. *G11B 27/36* (2013.01); *G06N 20/00* (2019.01)

(58) Field of Classification Search
 CPC ............................ G11B 27/36; G06N 99/005
 USPC .................. 386/252, 248, 253, 256, 257
 See application file for complete search history.

(56) References Cited

U.S. PATENT DOCUMENTS

2018/0322337 A1* 11/2018 Marty ................ G06K 9/00342

FOREIGN PATENT DOCUMENTS

CN        201637982 U    * 11/2010

* cited by examiner

*Primary Examiner* — Robert Chevalier
(74) *Attorney, Agent, or Firm* — Baker Botts L.L.P.

(57) ABSTRACT

A method includes identifying, using a machine learning algorithm, a recording device in a first image in a stream of images of a scene captured by a camera. The method also includes determining that the recording device is likely recording a protected resource based on a positioning of an aperture of the recording device and information associated with the recording device in the stream of images. The method additionally includes, in response to determining that the recording device is likely recording the protected resource, removing any content designated as protected content from a display screen.

20 Claims, 5 Drawing Sheets

SECURING PROTECTED CONTENT BY IDENTIFYING RECORDING DEVICES

BACKGROUND

The present disclosure relates to securing protected content, and specifically to securing protected content by identifying recording devices.

BRIEF SUMMARY

According to an aspect of the present disclosure, a method includes identifying, using a machine learning algorithm, a recording device in a first image in a stream of images of a scene captured by a camera. The method also includes determining that the recording device is likely recording a protected resource based on a positioning of an aperture of the recording device and information associated with the recording device in the stream of images. The method additionally includes, in response to determining that the recording device is likely recording the protected resource, removing any content designated as protected content from a display screen.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements of a non-limiting embodiment of the present disclosure.

DETAILED DESCRIPTION

Figure 1:
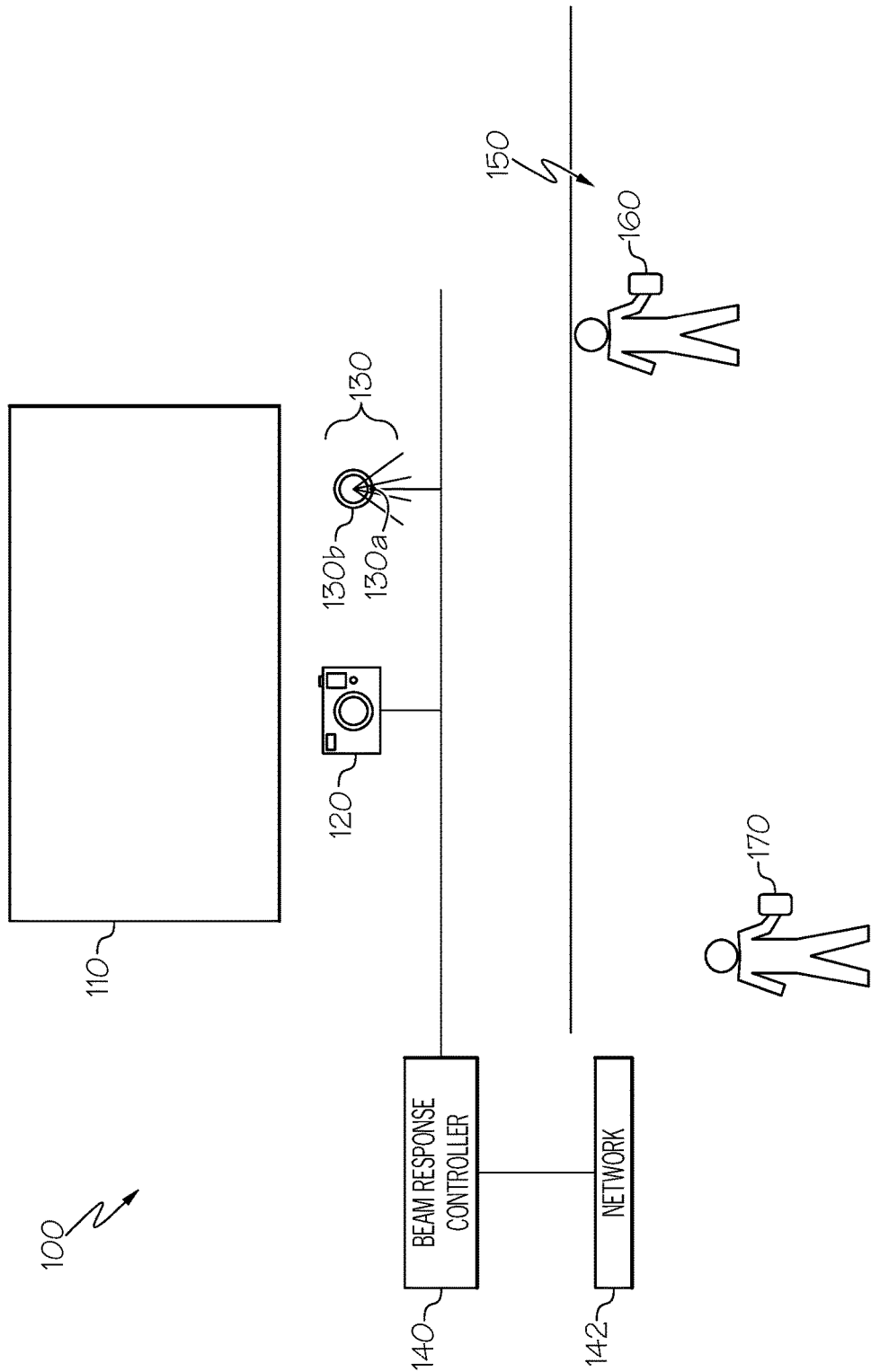
FIG. 1 is a high-level block diagram of one implementation of a system for detecting recording devices and emitting a corresponding interfering light beam illustrated in accordance with on non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Each activity in the present disclosure may be executed on one, some, or all of one or more processors. In some non-limiting embodiments of the present disclosure, different activities may be executed on different processors.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

Digital content and media owners often prohibit third parties from recording or taking pictures of protected property. For example, photography may be banned in certain scenarios where sensitive data is displayed. As another example, a movie producer attempts to deter recording and reproduction of his or her movies by displaying a warning screen before the movie begins. As another example, workers in secure areas of government facilities that handle sensitive information are prohibited from bringing any recording devices into the secure area. As yet another example, secure facilities often wish to deter tracking or surveilling of its premises. As yet another example, a printed ticket to a live theatrical performance contains a license accepted upon entrance of the production venue that prohibits the user from recording the performance event while signs prohibiting photography are conspicuously displayed in the event hall.

In many instances, violating express instructions, warnings, or laws prohibiting recording or taking photographs is punishable with fines and/or prison time. In some circumstances, illicit recording may be punishable as treason and carry even heavier consequences. However, although punishment for violations is severe, punishment is only a deterrent if enforcement and detection capabilities are sufficient. It is not surprising then that regular security breaches occur that allow criminals to copy sensitive or protected information. Often, those breaches often go undetected at the time of the breach. Punishment and preventative measures are quite clearly not suitable deterrents for modern bootleggers.

The teachings of the present disclosure present a solution aimed at automatically preventing visual recording devices from recording or capturing video of sensitive objects by initiating some reaction in response to recognizing an unauthorized recording device. For example, content can be removed for blocked out from a display when a recording device id identified in a crowd. As another example, this can be achieved by remotely disabling unauthorized recording devices. Specifically, the photo lens and aperture of an analog or digital camera may be susceptible to visible and invisible light frequency spectrums. These light frequencies, when aimed at a recording device and while controlling other factors such as divergence of the beam and projecting at sufficient strengths, can disable or nullify recording capabilities of a recording device. For example, a recording device can be remotely obstructed by a centrally located light, laser, or other light source aimed at the recording device. In certain embodiments, an interfering light source emitter is affixed to a pivotable turret that is responsive to a controller system. The system also includes a camera or set of cameras that constantly surveil the surroundings of the sensitive object. Image processing techniques including machine learning are used to identify known objects in the surrounding area. In some cases, cameras are identified and an interfering signal or beam is emitted in the direction of a lens of a detected camera. The system is responsive such that movements to the camera within the line of sight of the system are matched with modifications to the turret and light beam. Thus, recording can be severely degraded or even prevented. Moreover, detection is also increased such that responsive enforcement actions can be implemented in order to prevent transmission of any recorded information. In certain embodiments, such a system may use additional or alternative deterrents to discourage or prevent capturing or recording of sensitive information. For example, presentation materials can be removed or obscured, and offenders can be identified and even called out in the crowd for enforcement measures or for purposes of embarrassment among peers.

With reference to FIG. 1, a system 100 for detecting recording devices is illustrated in accordance with on non-limiting embodiment of the present disclosure. System 100 includes surveillance camera 120 and interfering light source 130, which are each connected to beam response controller 140. In certain embodiments, the beam response controller 140 may be a computer program loaded into a memory of a computing device and executed by one or more processors of the computing device. Thus, beam response controller 140 may be implemented using computer hardware connected to peripheral devices, such as camera 120 and light source 130, as well as other resources connected via network 142 such as external databases, processes, and the like. Beam response controller 140 is connected to peripheral surveillance camera 120 and receives in input stream of images captured from the surveillance camera 120. Beam response controller 140 is further connected to light source 130 and is configured to control a pivotable bearing attached to light source 130 so as to control a direction, strength, divergence, and other properties of a beam emitted from light source 130.

System 100 as illustrated in FIG. 1 is implemented in accordance with a non-limiting configuration, which in this case is set in a movie theater. Those of ordinary skill in the art will appreciate the wide range of settings applicable to the teachings of the present disclosure, and this disclosure should not be read as to be limited to the particular configurations listed herein. With reference to FIG. 1, a movie screen 100 projects a copyrighted or otherwise protected move, image, or other work. The theater also includes an audience section 150 with several audience members. In this example, both audience members have a smartphone that for didactic purposes each contain a recording device. For example, the illustrated embodiment may capture a typical scene at a movie theater. The illustrated embodiment may be used to show both examples where users are merely using their smartphones for personal use, such as texting, web browsing, or the like during the movie. In an additional or alternative example, FIG. 1 is used to show a bootlegger making in unauthorized copy of the content displayed on screen 110 by recording the content with the recording device 160.

Figure 3:
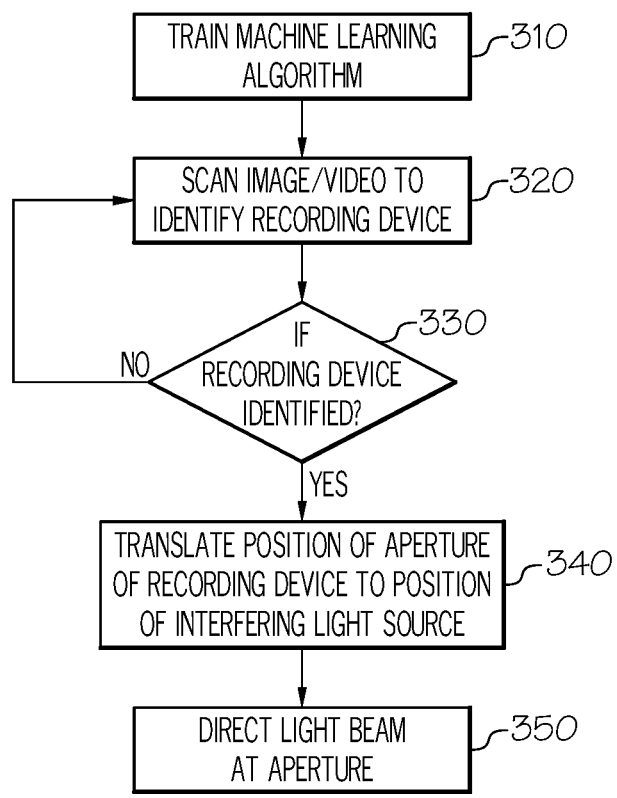
FIG. 3 is a flowchart of one implementation of a method for detecting recording devices and emitting a corresponding interfering light beam illustrated in accordance with a non-limiting embodiment of the present disclosure.

Using the example of FIG. 1, reference is now made to the flowchart set out in FIG. 3 to describe one non-limiting implementation of a method for identifying recording devices. At step 300, a machine learning algorithm is trained to identify recording devices in an image. For example, beam response controller 140 implements or communicates with a machine learning algorithm. The machine learning algorithm is trained to identify features in an image. Specifically, in this instance, a wide array of feature data comprising images having recording devices is presented to the machine learning algorithm. The machine learning algorithm identifies common patterns in the feature vector data associated with those training images. For example, the training data input to the system may consist of human verified images of the surveillance area that contain recording devices. Thus, the machine learning algorithm may be trained with images specific to the setting or application that the system is installed for.

For example, image processing techniques may enable the analysis of video data. One such analysis technique may identify features within an image. Features can include any object or person in a scene. For example, the feature recognition techniques may utilize databases of images, social-networks, or other repositories to identify objects and/or people within a scene. Once identified, information regarding the features can be extracted from the image and represented as feature vectors for a given object within the image or a given image as a whole. In certain embodiments, a feature vector for an image may indicate individual people within an image, as well as objects and other information about the image. The feature vector may also capture additional information such as time of day, number of people, or specific objects within the view frame. For example, the feature vector may include information regarding objects identified as cameras within a scene. This feature vector data is stored and used as either verified or unverified training data for a machine learning algorithm.

In the example of FIG. 1, the training data may consist of images of the audience section 150 with human or machine verified images where one or more users are using a recording device. Thus, the machine learning algorithm may become familiar with common attributes among images where a recording device is present. In a simplified example, consider a scenario where a movie bootlegger sets up a tripod with a camera for capturing a high quality recording of a movie. The machine learning algorithm is trained not only to identify the specific camera used, but also the fact that the camera is set up in the aisle, that the camera contains an aperture, that it is affixed to a tripod, and that a user is seated near the camera in an otherwise largely empty theater. Thus common features of the image in addition to the fact that it contains a camera are correlated with other training data images and are used to identify recording devices in new contexts. As another example, another bootlegger is more inconspicuous and is huddled over a handheld recording device attempting to conceal his or her actions.

In certain embodiments, the machine learning algorithm can be trained to analyze a scene for other features that may signal the presence recording device. For example, in addition to the presence of an aperture and an object that looks like a handheld video recorder, the machine learning algorithm detects the user's hunched over positioning with respect to the camera, and other body positioning signatures that indicate that the user is attempting to hide or conceal something. Again, these features may be suggestive of a user using a recording device to illegally record a protected resource, such as movie screen 110. These related features can be tracked and used to identify the presence or absence of a recording device in other images.

Figure 2:
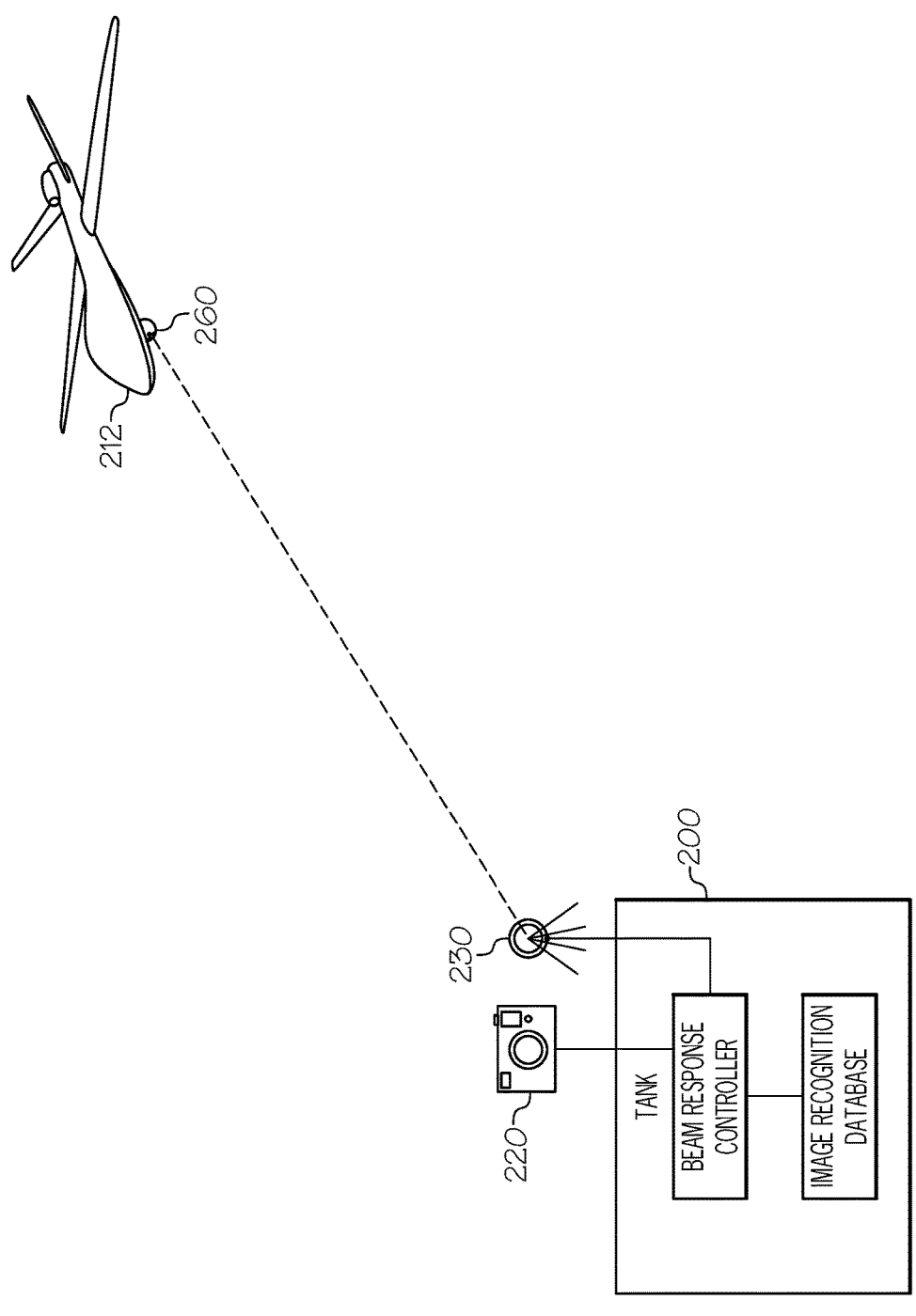
FIG. 2 is a high-level block diagram of one implementation of a system for detecting recording devices and emitting a corresponding interfering light beam illustrated in accordance with on non-limiting embodiment of the present disclosure.

As another example, the setting of FIG. 2 is provided to show a system for detecting a recording device and emitting an interfering light in the context of a military reconnaissance mission. For example, military equipment or personnel, such as tank 200 is outfitted with such a system as it conducts a reconnaissance mission. Drone 212 uses recording device 260 to capture images of tank 200, thus potentially enabling enemies to track the location of military convoys or troops. This information is useful to enemies who may wish to use information regarding whereabouts of military personnel in battle strategy planning. Similarly, a machine learning algorithm can be trained using images of the sky to identify surveillance drones using training data of actual drones at varying altitude levels.

In certain embodiments, the resolution of the camera may enable deciphering an aperture of the recording device. The machine learning algorithm can be trained to identify the precise recording device and mechanisms on that device. For example, most recording devices require use of some aperture protected by a photo lens coupled to a memory or photo medium for recording images. The machine learning algorithm can be trained to identify these parts of each identified recording device.

With reference to step 330, if a recording device is identified in the scene, further processing of the image is conducted. In certain embodiments, characteristics of the recording device can be determined. For example, the system may determine whether the recording device is pointed toward the protected content. As another example, the system may determine whether the recording device is associated with a user that is a known bootlegger or copier. For example, the system may maintain a database of known offenders. The machine learning algorithm may identify people within the image, such as by facial recognition or other mechanisms, and determine whether those people are associated with any previous instances of copying. Such a determination may weigh into the determination as to whether the recording device is potentially copying at image capture time.

For example, with reference to FIG. 1, two different users are each holding mobile phones (recording devices) 160 and 170. The system may determine that characteristics about device 160 make it more likely that it is recording the content projected on screen 110. Other characteristics regarding device 170 may signal that it is not recording the protected content projected on screen 110. For example, device 160 may be held by a person recognized as a bootlegger or identified with characteristics of bootleggers. Additionally or alternatively, mobile phone 160 may be pointed at the screen. In certain embodiments, some combination of these and other image features may indicate that a particular recording device is actively copying protected content.

In certain embodiments, the system may identify a type and/or characteristics or capabilities of the device. For example, the system may determine that a device is a mobile phone camera, a night vision device, a camcorder, or other specialized device. In certain embodiments, the capabilities of a particular device can be determined with reference to a catalog of device equipment and capabilities.

As another example, the system may identify known portions of a presentation that are more sensitive than others. The system may further identify recording devices that are actively recording based on correlations between appearance of the recording device and appearance of the protected content. For example, if the user takes out device 160 when a particularly sensitive piece of information is being displayed on screen 110, the system may identify that as suspicious behavior.

In certain embodiments, the system may initiate a reaction in response to identifying suspicious behavior of a user or identifying a recording device that is in a recording mode. The reaction can be designed or adapted to many different scenarios depending on the desired outcome. For example, the reaction may be designed to embarrass the targeted individual. As another example, the reaction may be designed to physically impede the ability of the device to capture the protected content. As another example, no noticeable reaction is initiated, but the system may alert an administrator or authorities to detain the individual. For example, the system can send an image of the user to the proper authorities. As another example, the system may flag the behavior as suspicious and alert an administrator to review the suspicious behavior for further action.

In the context of FIG. 1, the system may remove content from screen 110, such as by blanking out the screen to remove the protected content in response to determining that a user was illegally copying content. In certain embodiments, the system may instead project personally identifiable information about the copier onto the screen. For example, the system may identify a particular attendee at a conference as potentially recording protected information and project his or her name and image onto the screen instead of the protected content. Such reactions may serve to embarrass attendees and thus discourage their recording of protected information. Information regarding identified offenders can be maintained so that a set of known bootleggers is maintained. For example, systems operating at different locations can use the same image recognition techniques to cross reference attendees at an event against a shared list of known bootleggers.

In certain embodiments, the system may initiate a response designed to impede the ability of a recording device to capture content. For example, the system may generate a light beam aimed at the aperture of the recording device in order to impede the ability of the recording device to record protected content. With reference to step 340, when a recording device is identified, a position of the identified aperture of the recording device is translated to a viewpoint of a responsive light source. For example, the viewpoint of surveillance camera 120 and light source 130 are different in the scene of FIG. 1. Accordingly, some mapping between the viewpoints of the scene is required in order to properly aim the light beam at the aperture of recording device 160. Specifically, light source 130 includes a configurable light emission device 130b mounted on a remotely movable turret 130a. A controller controls the light source 130 to respond to behaviors detected in the scene.

Specifically, at step 350 the light source 130 is configured to responsively control the light emission device to project an appropriate light beam to the aperture of, for example, camera 160. In certain embodiments the attributes of the light beam are configurable with respect to features in the image. For example, the system may modify the divergence of the light source in response to a distance between the light source and the recording device. A recording device that is further away may require a light source with a narrower beam divergence than a recording device that is relatively close by.

In certain embodiments, the light emitted by the light emission device, or the spectrum of light emitted thereby, may be configurable. For example, the light emitted by the light emission device may be targeted to interrupt a detected device based on capabilities of the device. For example, the light emitted by the light emission device may be different for a mobile phone camera than for a night vision device. For example, a light spectrum that the recording device is sensitive to may be determined with reference to the capabilities of that device. Thus, the light emission device can be configured to emit a light in the spectrum designed to interrupt or disrupt the viewing or recording capabilities of the device.

In certain embodiments, the system may be configured to protect content in a slide show presentation, such as a POWERPOINT presentation. In response to detecting a camera or viewing device, the system may react in various manners. For example, some or all of the reactions described below may be initiated in response to detecting some behavior or device (e.g., a recording device, viewing device, suspicious activity, or the like). For example, the system may obfuscate the slide, by blanking the screen, replacing the image with a white slide, blurring or obfuscating the projected slide or other image in some way. For example, the system may alter a frequency of the projected image so that it cannot be captured or so that it is unlikely that the slide would be captured by a snapshot. In certain embodiments, the system may manipulate a controllable light source to emit a light beam to illuminate or call out the suspicious activity or offending device. For example, the system may attempt to embarrass the offending user by directing attention to the user with a light beam, or announcing the offending viewer's name if the viewer is recognized. In certain embodiments, the reaction may involve replacing the sensitive content with an image of the offending viewer. For example, if a user is attempting to take pictures of sensitive content, the sensitive content may be replace with a photograph of the user that is attempting to record the sensitive content. The photograph may be a stock photograph of the user, such as from a conference check-in procedure. In certain embodiments, the photograph may be a real-time photograph of the user as he/she is attempting to record the sensitive content.

Figure 4:
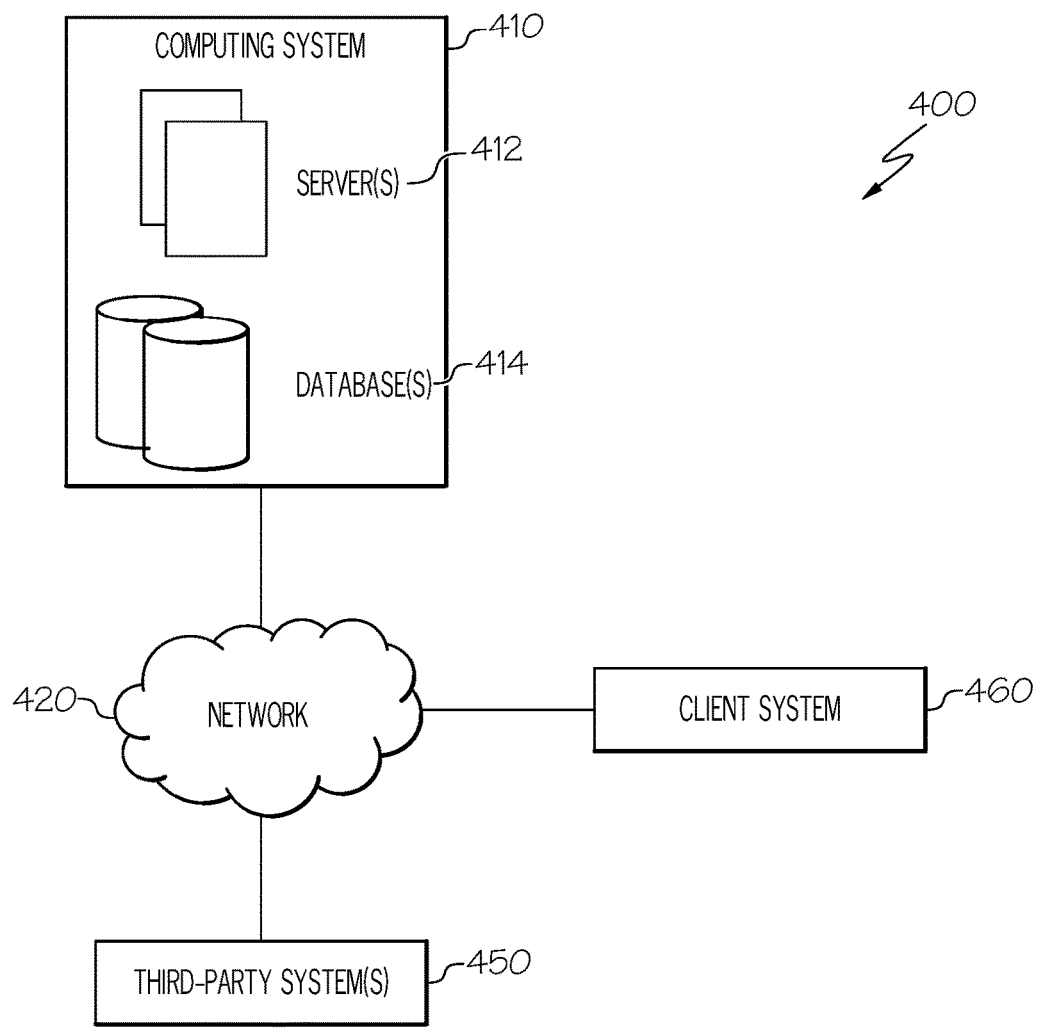
FIG. 4 is a high-level diagram of a computer network.

With reference to FIG. 4, a high-level block diagram of a computer network 400 is illustrated in accordance with a non-limiting embodiment of the present disclosure. Network 400 includes computing system 410 which is connected to network 420. The computing system 410 includes servers 412 and data stores or databases 414. For example, computing system 410 may host a server operating a process for securing protected content by identifying recording devices. For example, databases 414 can store surveillance information for a given audience area for viewing a protected resource, such as history information pertaining to footage captured by a surveillance camera of the audience area. Network 400 also includes client system 460, and third party system 450, which are each also connected to network 420. In certain embodiments, server 412 interfaces with databases 414 and third-party system 450 to retrieve information about identified features. For example, third-party system 450 may include a social-networking system, criminal database, or catalog of recording device images. Those of ordinary skill in the art will appreciate the wide variety of configurations possible for implementing a content protection platform as described in the context of the present disclosure. Computer network 400 is provided merely for illustrative purposes in accordance with a single non-limiting embodiment of the present disclosure.

Figure 5:
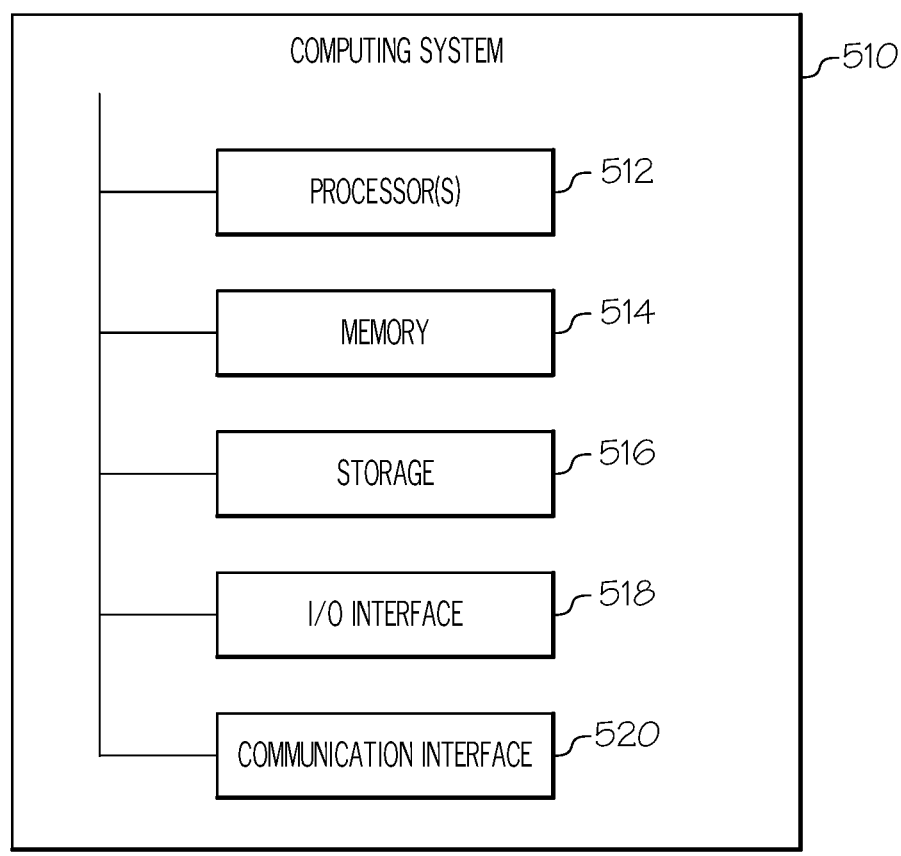
FIG. 5 is a high-level block diagram of a computer system.

With reference to FIG. 5, a computing system 510 is illustrated in accordance with a non-limiting embodiment of the present disclosure. For example, computing system 510 may implement a content protection platform in connection with the example embodiments described in the present disclosure. Computing system 510 includes processors 212 that execute instructions loaded from memory 514. In some cases computer program instructions are loaded from storage 516 into memory 514 for execution by processors 512. Computing system 510 additional provides input/output interface 518 as well as communication interface 520. For example, input/output interface 518 may interface with one or more external users through peripheral devices while communication interface 520 connects to a network. Each of these components of computing system 510 are connected on a bus for interfacing with processors 512 and communicating with each other.

The flowcharts and diagrams described herein illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, "each" means "each and every" or "each of a subset of every," unless context clearly indicates otherwise.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
   by a computing device, identifying, using a machine learning algorithm, a recording device in a first image in a stream of images of a scene captured by a camera;
   by the computing device, determining that the recording device is likely recording a protected resource based on a positioning of an aperture of the recording device and information associated with the recording device in the stream of images; and
   by the computing device, in response to determining that the recording device is likely recording the protected resource, removing any content designated as protected content from a display screen.

2. The method of claim 1, further comprising:
   generating a translated view of a position of the aperture in the first image for a viewpoint of a directional light source; and
   emitting an interfering light beam from the directional light source aimed at the aperture based on the position of the aperture in the translated view.

3. The method of claim 2, wherein a divergence of the light beam emitted from the directional light source is expanded or contracted based on a determined distance of the aperture of the recording device from the directional light source.

4. The method of claim 2, wherein the light beam emitted from the directional light source is a laser.

5. The method of claim 2, further comprising:
   generating a second translated view of a position of the aperture in the first image captured by the camera for a viewpoint of a second directional light source; and
   emitting a second interfering light beam from the second directional light source aimed at the aperture based on the position of the aperture in the second translated view.

6. The method of claim 2, further comprising:
   identifying, using the machine learning algorithm, a second recording device in the first image;
   by the computing device, determining that an aperture of the second recording device is pointing toward the protected resource;
   generating a second translated view of a position of the aperture for the second recording device for a viewpoint of a second directional light source; and
   emitting an interfering light beam from the directional light source aimed at the aperture for the second recording device based on its position in the translated view.

7. The method of claim 2, wherein generating the translated view comprises:
   generating a model of the scene captured by the camera;
   modifying an original viewpoint of the camera for the scene to the viewpoint of the directional light source; and determining a beam angle for the interfering light beam based on the position of the aperture in the translated view.

8. The method of claim 1, wherein the recording device is embedded in an aircraft.

9. The method of claim 2, further comprising:
identifying the recording device in a second image from the stream of images;
determining a change in the position of the aperture in the second image; and
modifying a direction of the interfering light beam from the directional light source based on the changed position of the aperture.

10. The method of claim 1, wherein the recording device is a smartphone.

11. A computer configured to access a storage device, the computer comprising:
a processor; and
a non-transitory, computer-readable storage medium storing computer-readable instructions that when executed by the processor cause the computer to perform:
identifying, using a machine learning algorithm, a recording device in a first image in a stream of images of a scene captured by a camera;
determining that an aperture of the recording device is pointing toward a protected resource;
generating a translated view of a position of the aperture in the first image for a viewpoint of a directional light source; and
emitting an interfering light beam from the directional light source aimed at the aperture based on the position of the aperture in the translated view.

12. The computer of claim 11, wherein the interfering light beam is a light beam in the visible light spectrum projected toward the aperture and emitted at a strength adequate to disrupt a recording ability of the recording device.

13. The computer of claim 11, wherein a divergence of the light beam emitted from the directional light source is expanded or contracted based on a determined distance of the aperture of the recording device from the directional light source.

14. The computer of claim 11, wherein the light beam emitted from the directional light source is a laser.

15. The computer of claim 11, wherein the computer-readable instructions further cause the computer to perform:
generating a second translated view of a position of the aperture in the first image captured by the camera for a viewpoint of a second directional light source; and
emitting a second interfering light beam from the second directional light source aimed at the aperture based on the position of the aperture in the second translated view.

16. The computer of claim 11, wherein the computer-readable instructions further cause the computer to perform:
identifying, using the machine learning algorithm, a second recording device in the first image;
by the computing device, determining that an aperture of the second recording device is pointing toward the protected resource;
generating a second translated view of a position of the aperture for the second recording device for a viewpoint of a second directional light source; and
emitting an interfering light beam from the directional light source aimed at the aperture for the second recording device based on its position in the translated view.

17. The computer of claim 11, wherein generating the translated view comprises:
generating a model of the scene captured by the camera;
modifying an original viewpoint of the camera for the scene to the viewpoint of the directional light source; and
determining a beam angle for the interfering light beam based on the position of the aperture in the translated view.

18. The computer of claim 11, wherein the recording device is embedded in an aircraft.

19. The computer of claim 11, wherein the computer-readable instructions further cause the computer to perform:
identifying the recording device in a second image from the stream of images;
determining a change in the position of the aperture in the second image; and
modifying a direction of the interfering light beam from the directional light source based on the changed position of the aperture.

20. A non-transitory computer-readable medium having instructions stored thereon that is executable by a computing system to perform operations comprising:
identifying, using a machine learning algorithm, a device and a suspicious user in a first image in a stream of images of a scene captured by a camera;
determining a type and a capability of the device;
determining that the device is likely recording or enabling a user to view a protected resource based on (1) a positioning of an aperture of the viewing device, (2) information associated with the device in the stream of images, and (3) information associated with the suspicious user;
removing any content designated as protected content from a display screen; and
emitting light in a particular spectrum covering an active spectrum of the device based on the type and the capability of the device.

* * * * *